F. C. YOUNGERMAN.
GEARING.
APPLICATION FILED AUG. 29, 1912.
1,073,313.
Patented Sept. 16, 1913.
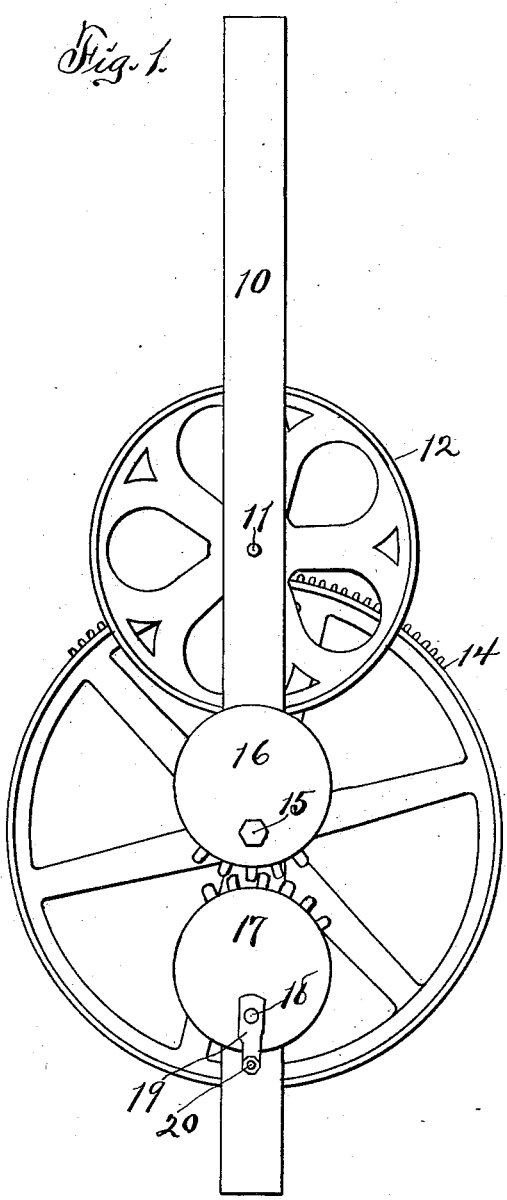
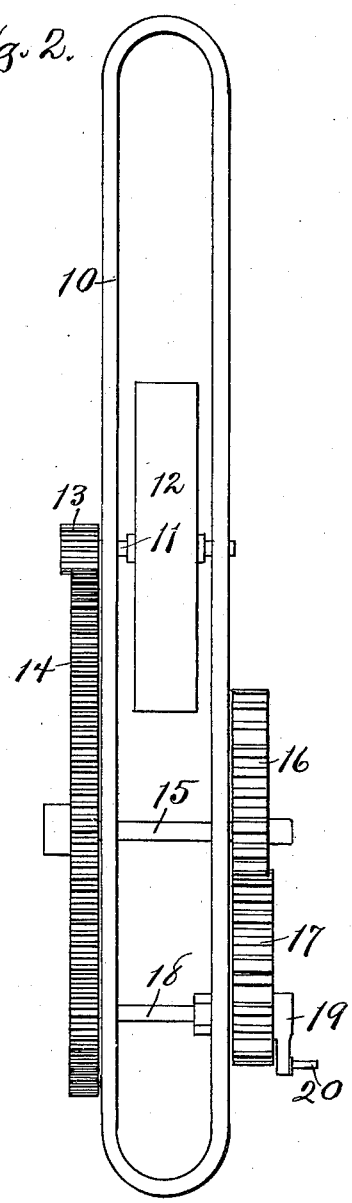

UNITED STATES PATENT OFFICE.

FRANK C. YOUNGERMAN, OF GRIMES, IOWA.

GEARING.

1,073,313.  Specification of Letters Patent.  Patented Sept. 16, 1913.

Application filed August 29, 1912. Serial No. 717,704.

*To all whom it may concern:*

Be it known that I, FRANK C. YOUNGERMAN, citizen of the United States of America, and resident of Grimes, Polk county, Iowa, have invented a new and useful Gearing, of which the following is a specification.

The object of this invention is to provide an improved construction for gearing, which is particularly adapted for use with driving mechanism.

My invention consists in the construction, arrangement and combination of elements hereinafter set forth, pointed out in my claim and illustrated by the accompanying drawing, in which—

Figure 1 is a side elevation of the device. Fig. 2 is an elevation at right angles to Fig. 1.

In the construction of the device as shown the numeral 10 designates a suitable support, which may vary in size, form and construction as desired. A power shaft 11 is journaled in the support 10 and may be driven rotatively by any desired means such as a pulley 12. A spur gear 13, preferably of relatively small diameter, is mounted rigidly on one end portion of the power shaft 11, and meshes with a pinion 14, preferably of relatively large diameter mounted rigidly on one end portion of a countershaft 15 journaled in the support 10 parallel with the power shaft 11. A spur gear 16 is mounted eccentrically on the countershaft 15 and is located on the opposite side of the support 10 from the pinion 14. The spur gear 16 meshes with a pinion 17 mounted eccentrically on a shaft 18 journaled in the support 10 parallel with the countershaft 15. The eccentric spur gear and the eccentric pinion preferably have teeth of the same pitch and are identically arranged on their shafts in respect of eccentricity in order that they will remain in mesh at all times during the rotation thereof. The eccentric pinion 17 is provided with means for applying power to a follower (not shown) such as a crank arm 19 carrying a journal or wrist pin 20 adapted for travel concentrically relative to the shaft 18. The eccentric pinion and devices driven thereby are by this means given variable speed, which is of special advantage in pumps, well drills, and the like where the load is not constant and movement of an element in one direction at greater speed than in another direction or with greater power in one direction than the other is desired.

I claim as my invention—

In a gearing, a support including two spaced parallel portions, a power shaft journaled in said portions, a pulley for driving the shaft mounted on the latter and located in the space between said portions of the support, a spur gear on the shaft located on the outer face of one of the portions, a countershaft and a third shaft journaled in the support, intermeshing gears eccentrically mounted on the counter and third shafts, and a large gear on the countershaft directly meshing with said spur gear on the power shaft, all of the three shafts being in vertical alinement.

Signed by me at Des Moines, Iowa, this twenty-ninth day of February, 1912.

FRANK C. YOUNGERMAN.

Witnesses:
S. C. SWEET,
W. W. FINK.

---

Copies of this patent may be obtained for five cents each, by addressing the "Commissioner of Patents, Washington, D. C."